March 25, 1958   D. E. CARLSON   2,828,034
BOAT TRAILER

Filed April 3, 1956   3 Sheets-Sheet 1

Delbert E. Carlson
INVENTOR.

BY
Attorneys

March 25, 1958     D. E. CARLSON     2,828,034
BOAT TRAILER
Filed April 3, 1956     3 Sheets-Sheet 2
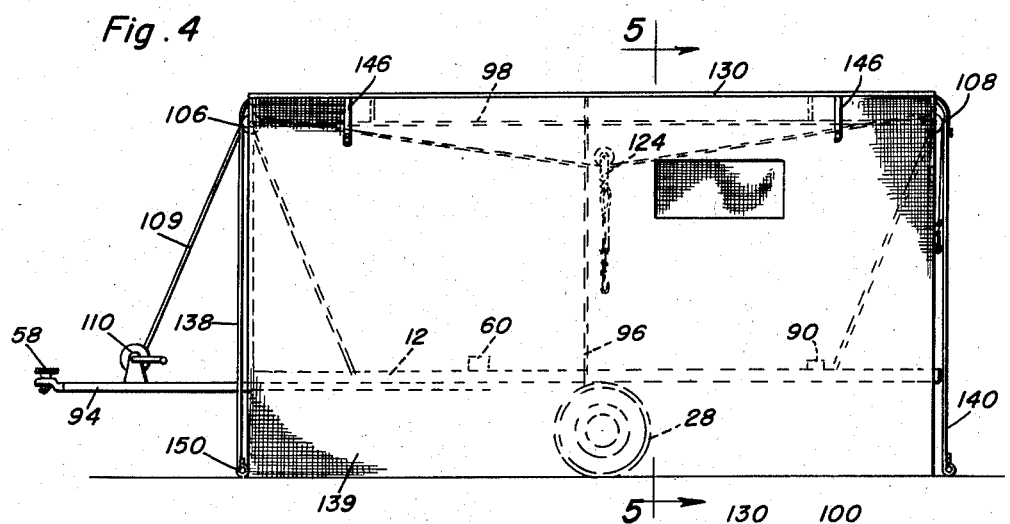
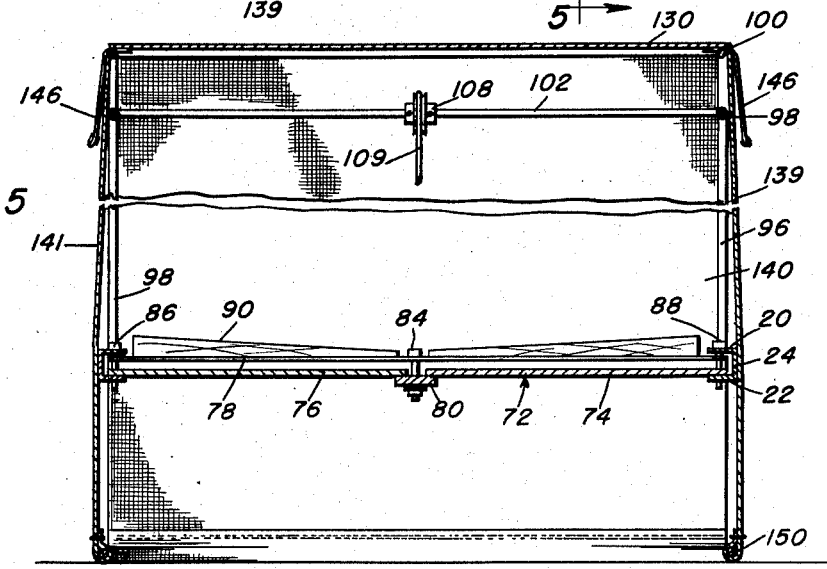
Delbert E. Carlson
INVENTOR.

March 25, 1958 — D. E. CARLSON — 2,828,034
BOAT TRAILER
Filed April 3, 1956 — 3 Sheets-Sheet 3

Delbert E. Carlson
INVENTOR.

United States Patent Office 2,828,034
Patented Mar. 25, 1958

2,828,034

BOAT TRAILER

Delbert E. Carlson, Spenard, Territory of Alaska

Application April 3, 1956, Serial No. 575,864

4 Claims. (Cl. 214—394)

This invention relates to improvements in trailers of the convertible type and is particularly related to a boat trailer which is arranged to form an enclosure for the boat or an enclosure of general application as well as transport, lift and lower a boat.

In connection with the nature and substance of the invention, one embodiment thereof is designed for easy one-man loading and unloading by a simple arrangement of pulleys. By cranking a winch that is conveniently located, the boat is elevated and at the same time moved forward so as to be raised from the water and applied onto the boat trailer in the operative position, whereby it may be moved with a minimum of difficulty. Accordingly, it is an object of the present invention to provide a convertible boat trailer which is very easy to use by one person for lifting or launching a boat and after being removed from the water and applied onto the trailer, the boat is ready for easy transportation.

A further object of the invention is to provide a boat trailer as described above wherein there are means for converting the trailer into a garage for the boat or, when desired, to a camping trailer. After a boat is launched in a matter of a few minutes the trailer is easily converted into excellent living quarters. This conversion may take place by several expedients, one being by the use of drop curtains and another being by the use of siding, such as the lightweight aluminum which is now commercially available.

A still further object of the invention is to provide a practical boat trailer of the convertible type which may be manufactured at a low cost in comparison to existing boat trailers and yet, which is not only durable and which not only serves the intended purpose with excellence, but also is attractive and may be easily made so.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a side elevational view similar to that of Figure 2 but showing the trailer in such position that it is usable as living quarters;

Figure 5 is a transverse sectional view taken on the line 5—5 of Figure 4;

Figure 6 is a schematic top plan view of a part of the rear cradle showing the removability or adjustment thereof;

Figure 8:
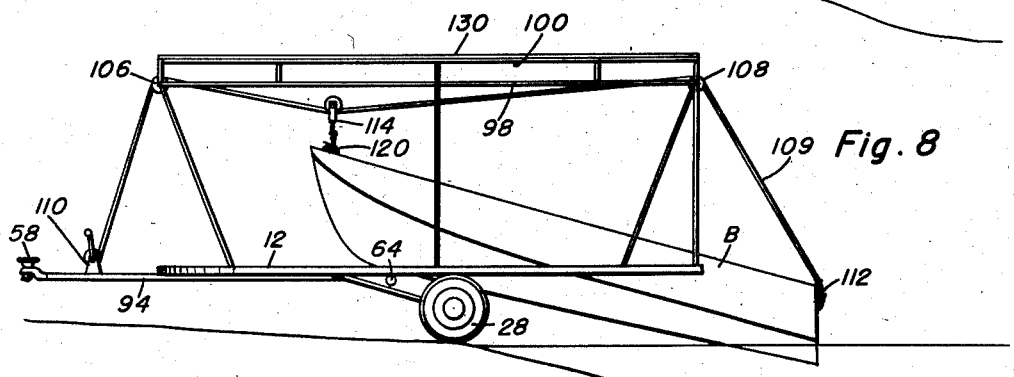
Figure 9:
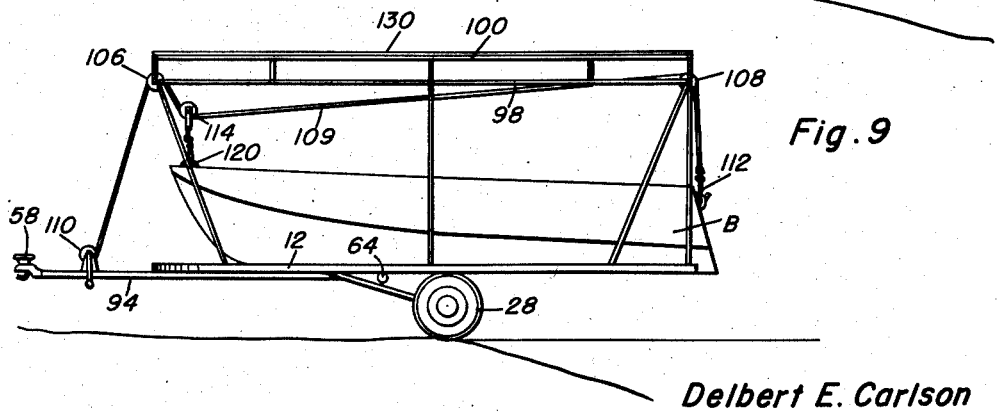

Figure 8 is an elevational view of the boat after the bow has been lifted from the water by manipulation of the winch on the trailer; and, Figure 9 is an elevational view of the trailer showing the boat after it has been completely placed upon the trailer and in readiness for transportation, this last step being achieved by further actuation of the winch that is attached to the tongue or drawbar of the boat trailer.

In the accompanying drawings I have illustrated one preferred embodiment of the invention. It is understood that this embodiment of the invention merely exemplifies the principles thereof and is not the only mode of practice of the invention.

The trailer 10 comprises a chassis 12 that has side members 14 and 16, the side members having an arcuate front 18. These side members and the arcuate front thereof are preferably made of a channel (Fig. 5) that has an upper and lower side 20 and 22 together with a vertical side 24. In other words, the channel of each side opens inwardly in confronting relation to each other. Wheels 26 and 28 are mounted on spindles 30 and 32. The spindles are in a horizontal plane and have upwardly and inwardly extending braces 34 and 36, respectively, together with upwardly and forwardly extending braces 38 and 40. The braces at their forward ends are joined by spindles 42 and 44 that are mounted for rotation in bearings 45 and 46 which are welded or otherwise rigidly attached to the sides 14 and 16 of the chassis. Coil springs 48 and 50 are seated on plates that are attached to the spindles 30 and 32 and upon the bottom surfaces of the sides of the chassis. This constitutes the suspension for the wheels 26 and 28. Shock absorbers and brakes may be added if they are deemed desirable.

A tongue or drawbar 54 is welded to the chassis and explicitly, to the cross member 56 that carries the bearings 45 and 46 and to the front part of the arcuate member 18 of the chassis 12. The tongue protrudes forwardly of the chassis and has a ball joint 58 or other type of hitch for attachment to a motor vehicle.

A permanently mounted but adjustable cradle 60 is secured to the cross member 56 in advance of a device for guiding the bow of the boat as it is moved onto the trailer. This device comprises a pair of rollers 64 and 65 that are mounted on spindles carried by side plates 66 and 67. These side plates are welded or otherwise rigidly secured to the cross member 56, and one roller is at a slightly higher elevation than the other, but both of them are behind the cross member 56.

Platform 70 is attached to the cross member 56 and to the arcuate part 18 of the chassis. It is secured by suitable fasteners such as screws or bolts. The trailer chassis is open from the cross member 56 rearwardly when it is in condition for lifting or launching the boat B. However, when the trailer is used for purposes other than lifting or lowering the boat B, floor 72 may be used. The floor consists of two panels 74 and 76 that are mounted at their front ends on cross member 56, their rear ends on a cross member 78, and along their longitudinal edges on the lower sides 22 of the sides 14 and 16 of the trailer chassis 12. The confronting longitudinal edges of the floor panels 74 and 76 are disposed on a removable longitudinal support 80 that extends between the cross member 56 and the cross member 78. A removable pin or bolt 82 extending through an aperture in the longitudinal member 80 and an aperture in the cross member 56 holds the front end of the longitudinal member 80. A rear bolt or pin 84 extends through aligned apertures in the cross member 78 to fasten the rear end of the longitudinal member 80. Bolts or pins 86 and 88 are passed through aligned apertures in the ends of the cross member 78 and in the sides 14 and 16 of the chassis 12. This detachably mounts the cross member 78 on which cradle 90 is secured. This is the rear cradle of the trailer on which the boat is adapted to be supported. The rear cross member 78 may either be swung to an inoperative position in parallel relationship to either of the sides 14 or 16 of the trailer chassis 12 or, it may be completely detached as found expedient by the owner of the trailer.

A frame 94 rises upwardly from the chassis 12, this frame consisting of upwardly extending frame members 96 that are welded or otherwise rigidly fixed to the sides of the chassis together with horizontal upper members connected, as by being welded, to the tops of the uprights 96. A horizontal rail 100 is mounted over the top members 96 of the frame 94 and on short studs extend therefrom. An ample number of cross members 102 and 104 for example, extend across the frame at the top thereof to provide the necessary rigidity of construction and strength. Cross member 104 has a pulley 106 mounted for rotation intermediate its ends, while pulley 108 is mounted for rotation intermediate the ends of the cross member 102. A single rope 109 is entrained over the pulleys 106 and 108 and is attached at its forward end to winch 110. This winch is carried by the tongue 94 behind the ball joint 58 and in advance of the chassis 12. The rope 109 may be made of hemp, metal or other materials as found desirable or expedient. A hook 112 is attached to the rear end of the rope 109. A carriage 114 that has a pulley 116 adapted to ride on the cable between pulleys 106 and 108, is provided for the purpose of attaching to the handle 120 on the bow of the boat B. In this connection, there is a rope 122 attached to carriage 114 and it has a hook 124 at its lower end.

A roof 130 is disposed on the rail 100 and is attached thereto by standard fasteners. This roof may be of any material considered suitable such as wood or aluminum. The members 98 below the roof 130 form a means to accommodate the floor panels 74 and 76 when the floor panels are not in use. They accommodate these panels by simply forming a support for them.

Means forming an enclosure of the trailer are operatively connected to the trailer. These means may consist of siding panels or drop curtains. In the accompanying drawings there are four drop curtains 138, 139, 140 and 141. Each is adapted to be rolled up when it is not in use and attached in place by means of straps 146 or other equivalent fasteners immediately below the rail 100 to which they are attached. When lowered, they are anchored into the ground by means of pegs or the bottoms may be weighted as at 150. In either event, such expedients as windows, doors and the like may be provided in the panels, and any suitable material of construction, such as nylon, canvas or duck may be used for the side curtains.

Figure 1:
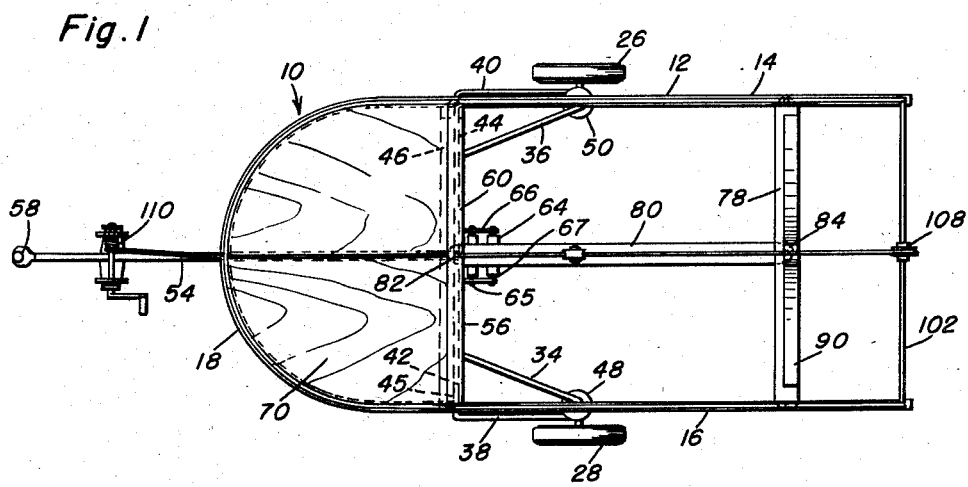
Figure 1 is a top plan view of a trailer which embodies the principles of the invention.
Figure 2:
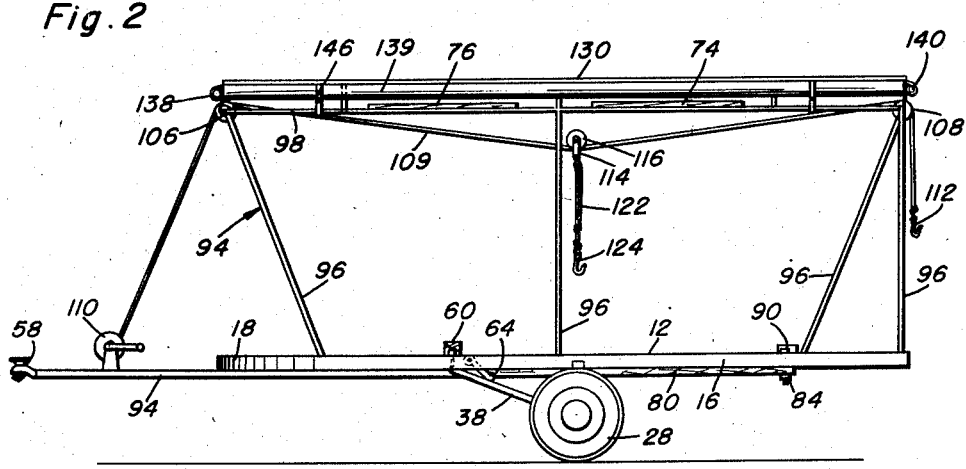
Figure 2 is an elevational side view of the trailer in Figure 1.
Figure 3:
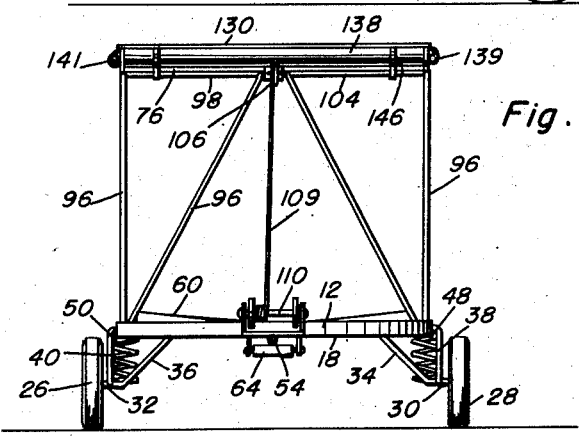
Figure 3 is a rear view of the trailer in Figure 1.
Figure 7:
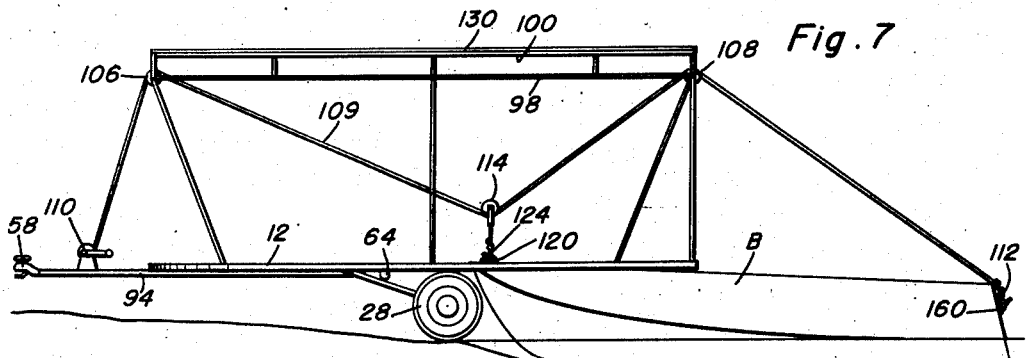
Figure 7 is a diagrammatic elevational view showing the boat that is about to be lifted from the water.

In use of the device, when lifting the boat from water, the trailer is backed to the water edge as shown in Figure 7. Rope 109 is extended outwardly so that the hook 124 may be attached to the handle 120 at the bow of the boat. There are two handles 160 attached to the transom of the boat at its stern, and the hook 112 is extended through both of them and then attached to itself in the nature of a bridle. Thereafter, the winch is set into operation by hand. The initial force applied to the rope 109 is in such direction that the bow of the boat is lifted as shown in Figure 8. After being lifted, the force then lifts the stern of the boat from the water and pulls it forwardly. When pulled completely forward as shown in Figure 9, the boat trailer is ready for transportation. It is explicitly pointed out that the boat B is moved forwardly on the trailer by the pull of the single rope 109 through a force applied from a single source, namely the winch 110. Morever, the movement of the boat forward onto the trailer is made possible because the carriage 114 is capable of moving between the rear pulley 108 to assume its position closely adjacent to the forward pulley 106 on the trailer.

After the boat is moved or before it is moved, the side curtains may be lowered in order to provide a shelter for the boat. A boat may be kept sheltered all winter in this manner in areas where the boats are customarily removed from the water during the wintertime. There are many other advantages in having the boat protected for a period of time, for example, after the boat is worked on or painted or during inclement weather.

A second but equally important if not more important function of the convertible feature of the trailer is that the trailer may be used as a living quarter, this having been mentioned previously.

The rear cradle 90 is something that is adjusted to be used. Although the rope 109 is sufficiently strong to support the boat B, when the boat is puled forwardly onto the trailer, it rolls over the two rollers 64 and 65 so that the forward end thereof comes to rest upon the forward cradle 60.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. In a boat trailer, a chassis, a frame rising from said chassis, a drawbar on said chassis, a winch carried by said drawbar, a rope extending from said winch, a front and a rear overhead pulley carried by said frame, said rope being entrained over said puleys, a hook at the end of said rope to fasten to the stern of a boat, means movable on said rope between said pulleys to attach to the bow of the boat, so that when said rope is wound on the winch the boat is both drawn toward the trailer chassis and lifted thereon first from the bow and then from the stern.

2. In a boat trailer, a chassis, a frame rising from said chassis, a drawbar on said chassis, a winch carried by said drawbar, a rope extending from said winch, a front and a rear overhead pulley carried by said frame, said rope being entrained over said pulleys, a hook at the end of said rope to fasten to the stern of a boat, means movable on said rope between said pulleys to attach to the bow of the boat, so that when said rope is wound on the winch the boat is both drawn toward the trailer chassis and lifted thereon first from the bow and then from the stern, a front cradle extending across said chassis, a rear cradle, means movably securing said rear cradle across said chassis.

3. In a boat trailer, a chassis, a frame rising from said chassis, a drawbar on said chassis, a winch carried by said drawbar, a rope extending from said winch, a front and a rear overhead pulley carried by said frame, said rope being entrained over said pulleys, a hook at the end of said rope to fasten to the stern of a boat, means movable on said rope between said pulleys to attach to the bow of the boat, so that when said rope is wound on the winch the boat is both drawn toward the trailer chassis and lifted thereon first from the bow and then from the stern, at least one roller carried by said chassis and located on the longitudinal center line thereof, and a cradle for the boat carried by the chassis and disposed in advance of said roller.

4. In a convertible trailer for a boat, the combination of a chassis, wheels, means mounting said wheels for rotation on said chassis, a frame extending upwardly from said chassis, cross members attached to said frame, fore and aft pulleys mounted for rotation on two of said cross members, a winch, a rope attached to said winch and extending over said pulleys, a carriage movable on said rope between said fore and aft pulleys and adapted to attach to the bow of a boat, said rope being adapted to attach to the stern of the boat so that upon actuation of said winch the boat bow is lifted upwardly and forwardly and then the stern upwardly and forwardly all in response to actuation in the same direction of said winch in order to load the boat onto the trailer.

References Cited in the file of this patent

UNITED STATES PATENTS

| | | |
|---|---|---|
| 2,531,947 | Reading | Nov. 28, 1950 |
| 2,543,349 | Britton | Feb. 27, 1951 |